United States Patent [19]

Pavey, Jr.

[11] 3,930,254

[45] Dec. 30, 1975

[54] SEISMIC STREAMER CONSTRUCTION FOR MINIMIZING HYDROPHONE RESPONSE TO VIBRATION PRODUCED PRESSURE FIELDS

[75] Inventor: George M. Pavey, Jr., Dallas, Tex.

[73] Assignee: Whitehall Corporation, Dallas, Tex.

[22] Filed: Apr. 9, 1974

[21] Appl. No.: 459,326

[52] U.S. Cl. .................. 340/7 R; 340/3 T; 340/10; 174/101.5
[51] Int. Cl.² ........................................ G01V 1/16
[58] Field of Search ..................... 340/7 R, 3 T, 10; 174/101.5

[56] References Cited
UNITED STATES PATENTS

| | | | |
|---|---|---|---|
| 3,432,000 | 3/1969 | Ongkiehong et al. | 340/7 R |
| 3,518,677 | 6/1970 | Florian | 340/7 R |

Primary Examiner—Maynard R. Wilbur
Assistant Examiner—H. A. Birmiel
Attorney, Agent, or Firm—Mason, Fenwick & Lawrence

[57] ABSTRACT

A marine seismic streamer construction for minimizing hydrophone response to vibration produced pressure fields, wherein a pair of hydrophones in the outer tubular jacket or hose are supported on the faces which confront each other of a pair of tightly fitted pistons in the jacket firmly secured to the steel towing cables of the streamer and located close together so that substantially the same motion in phase, amplitude and frequency is imparted to both pistons and the hydrophones produce outputs of opposite sign responsive to sound pressure fields caused by vibrating motion of the streamer components.

3 Claims, 4 Drawing Figures

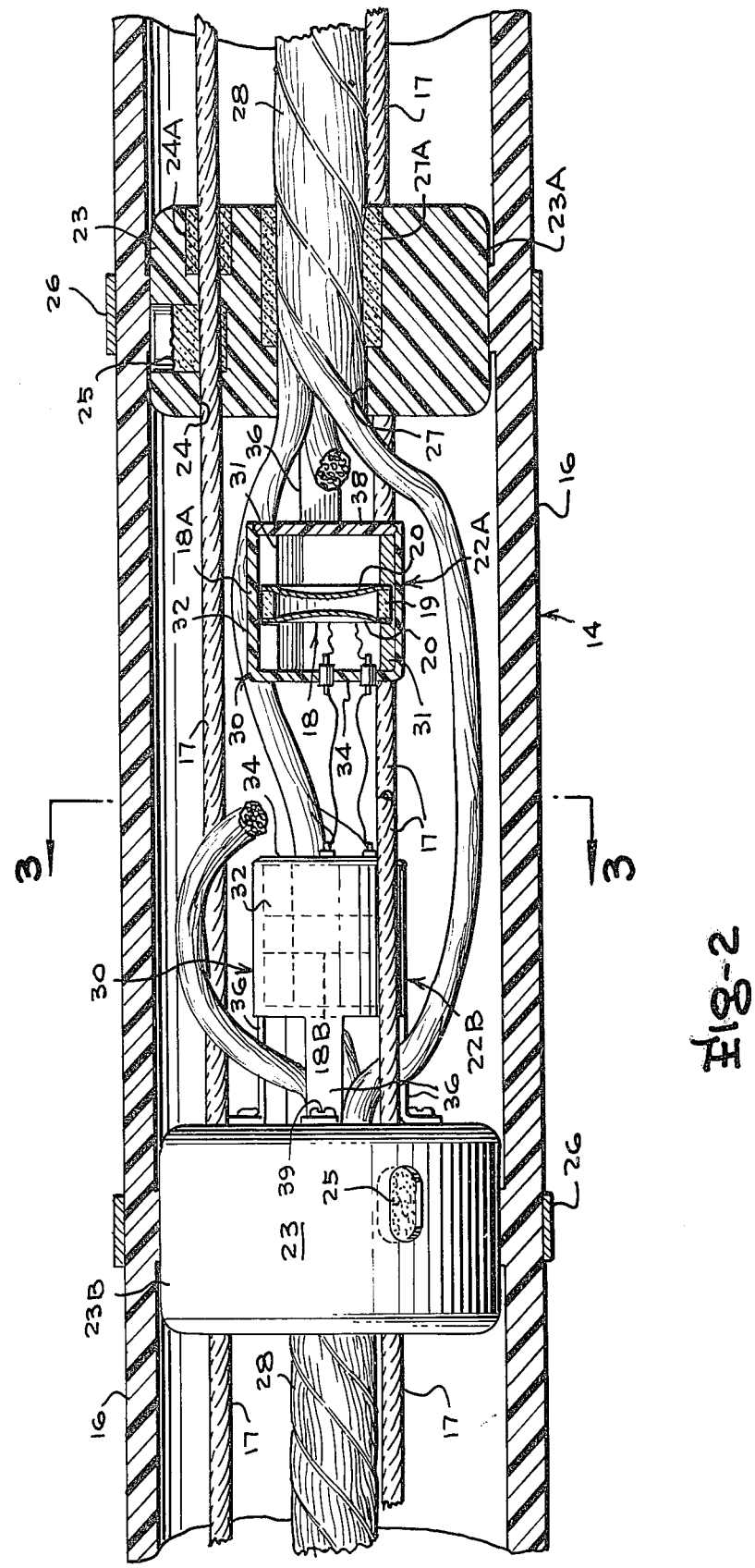

3,930,254

SEISMIC STREAMER CONSTRUCTION FOR MINIMIZING HYDROPHONE RESPONSE TO VIBRATION PRODUCED PRESSURE FIELDS

BACKGROUND AND OBJECTS OF THE INVENTION

The present invention relates in general to marine seismic cable systems adapted to be towed at a predetermined depth for seismic surveying for prospecting purposes to survey sub-aqueous geological formations and exploring oil-retaining subsurface terrestrial structures by detecting seismic signals received by a plurality of hydrophone arrays in the streamer section. More particularly, the present invention relates to marine seismic detection streamers wherein a plurality of hydrophone-containing streamer sections are serially connected together, the sections including structure for eliminating or minimizing sound pressure fields which are produced in this form of vibratory motions of the various components within the streamers and within the hydrophones themselves.

Heretofore, a number of marine seismic detection cables or streamers, the terms being used interchangeably, have been devised for making seismic surveys of terrestrial sub-surface structures disposed beneath sea water. In general, the marine seismic streamers employed in modern seismic marine surveying systems have been of the general construction illustrated, for example, in earlier U.S. Pat. Nos. 2,465,696 or 2,729,300 issued to Leroy C. Paslay et al, wherein the streamers have included a lead-in cable and a long series of serially connected active streamers sections, each usually formed of a plastic tube filled with a liquid of selected buoyancy characteristics and surrounding an array of hydrophones, strain cables, structural spacers, transformers and transformer holders, mechanical and electrical leads or connectors, and end caps. Such marine seismic streamers of cables may in many cases be a mile or more in length, with each section being typically 100 feet or more in length. During seismic survey or prospecting operations, such streamers are towed by the seismic survey vessel at a selected depth below the surface of the sea, and are maintained at the desired underwater depth by any of several types of devices, such as buoyancy regulating systems or depth control paravane type structures.

Much activity has been devoted to attempts to improve the ratio of signal to unwanted noise in such underwater-towed acoustic arrays for seismic prospecting. Among the sources of noise which may obscure or partially obscure the electrical signal output from hydrophones in seismic prospecting applications are noise in the amplification system, thermal noise generated in the medium, noise radiated from other sources, noise output from the hydrophone due to erratic motion imparted to the hydrophone by turbulent flow of water relative to the hydrophone housing, and vibration noise transmitted through the restraining, holding, and/or towing lines. The last two of the above-listed types of noise have been serious limiting factors in some prior art seismic streamers on the useful sound information picked up and on the speed of towing. Obviously, the effect of these last two types of noise may be reduced by decreasing the physical size of the hydrophone, but such reduction in size causes a reduction in sensitivity which will ultimately mean that the noise output due to noise in the amplification system and thermal noise may equal or exceed that due to the other causes. Since the speed with which a marine survey at a certain depth can be made with a streamer is limited by the signal-to-noise ratio, improvement in the signal-to-noise ratio will provide either improved signal output from the hydrophone in the seismic streamer sections towed at the same speeds as before, or would permit towing at higher speeds, thus realizing reduced survey costs, while still obtaining output signal quality as good as that provided by seismic streamers previously available. Earlier U.S. Pat. No. 3,660,809 discloses a particular hydrophone structure which reduces the acceleration sensitivity of the hydrophone elements without impairing their pressure-sensing ability, thus providing a high sensitivity to sound pressure variations within the required frequency range and a low sensitivity to accelerations produced by vibrations in the streamer system.

Having virtually eliminated the response of the hydrophone due to inertia effects by the hydrophone construction disclosed in U.S. Pat. No. 3,660,809, there remains an unwanted response due to actual sound pressure fields which are produced by vibratory motions of the various components within the streamer, including the end caps or coupling devices, the spacers, the transformers, and transformer holders, and the hydrophones themselves. These are very difficult to distinguish from the desired seismic signals arising from sound pressure originating outside the streamer because they are both actual sound pressure fields.

An object of the present invention is the provision of an arrangement for mounting hydrophones in the sections of marine seismic detection streamers in such a manner as to eliminate or minimize unwanted response of the hydrophones to sound pressure fields which are produced by vibratory motion of the components within the streamers.

Another object of the present invention is the provision of a novel mounting arrangement for hydrophones in sections of marine seismic detection streamers wherein equal and opposite signals from the unwanted sound pressure field is produced in an associated pair of hydrophones in such a way as to cancel out the unwanted signals without impairing the desired seismic signals arising from sound pressure originating outside the streamer.

Other objects, advantages, and capabilities of the present invention will become apparent from the following detailed description, taken in conjunction with the accompanying drawing illustrating a preferred embodiment of the invention.

A BRIEF DESCRIPTION OF THE FIGURES

FIG. 2 is a fragmentary longitudinal section view of a portion of a streamer section having hydrophones mounted therein in accordance with the present invention;

DETAILED DESCRIPTION OF PREFERRED EMBODIMENT

Figure 1:
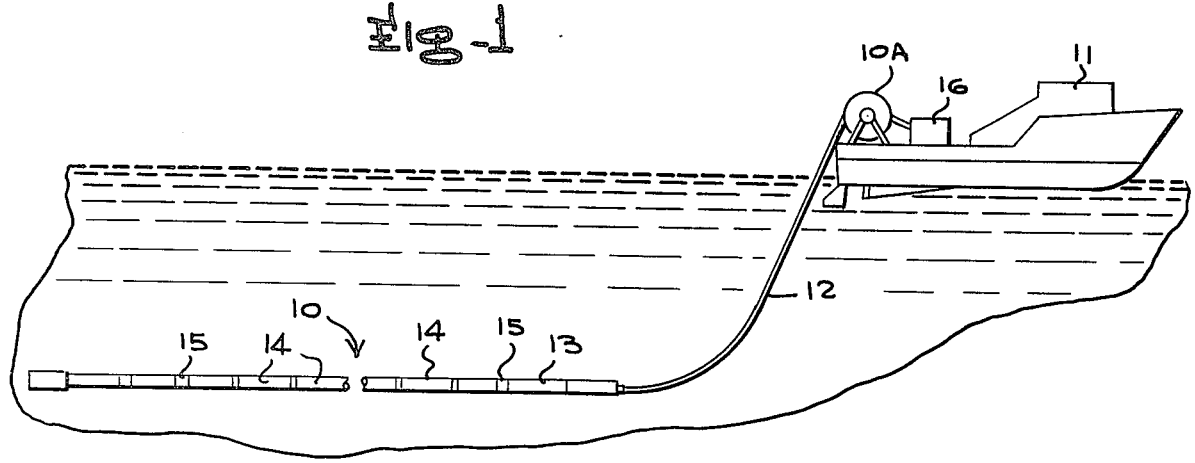
FIG. 1 is the diagrammatic view of marine seismic streamer made up of a plurality of serially connected streamer sections having hydrophone arrays, shown in normal condition while being towed.
Figure 3:
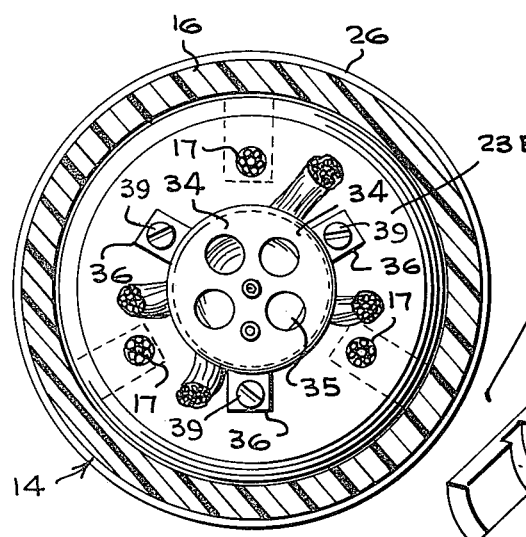
FIG. 3 is a fragmentary transverse section view, taken along the line 3—3 of FIG. 2, showing details of construction of the mounting spider for supporting each hydrophone.

Referring to the drawing, wherein like reference characters designate corresponding parts throughout the several figures, there is illustrated in FIG. 1 in diagrammatic form a seismic detection streamer cable 10 coupled to a drum or similar device diagrammatically indicated at 10A on a towing vessel 11, so that the seismic detection streamer 10 can be towed in normal fashion at a preselected depth through fresh or sea water by the towing vessel 11. is to be understood that the streamer may be either a seismic detection streamer to be employed in seismic prospecting, or may be a passive underwater detection streamer for detecting sounds for other purposes, such as for use in anti-submarine warfare detection systems, and the like. The detection streamer 10 includes a lead-in cable 12 which may have fairings and contains, typically, the signal wires leading from hydrophones in what are termed the active sections of the streamer, as well as strain cables and other connection elements required for operation. The lead-in cable typically is followed by, for example, an elastic section 13, which may be of the construction disclosed in my earlier U.S. Pat. No. 3,319,734 to minimize adverse effects arising from vibrations in the lead-in tow cable on the detection of seismic signals, and the elastic section 13 is followed by active sections 14, coupled serially together and each containing a plurality of hydrophones designed to respond to the acoustic pressure variations forming the seismic signals to be detected. The active streamer sections 14 may be separated at desired locations, if desired, by inactive streamer sections 15 of conventional construction. Depth control means, not shown, would be typically associated with the streamer to maintain the streamer at the desired operating depth, which may take the form of paravane depth control devices or pressure sensing means for regulating the buoyancy of the streamer in a known manner.

The general method of operation of such seismic detection streamers when employed in seismic operations is described in the prior Paslay patent, U.S. Pat. No. 2,465,696. The streamer sections 14, many of which are arranged in serial relation along the streamer cable and are coupled together by various types of coupling devices, typically may form a steamer of about one mile or more in length, with the arrays or groups of hydrophones in the respective active sections spaced in a desired arrangement along the associated streamer section. The outputs of the hydrophones in each section may be connected in parallel in the usual manner and connected to an impedance-matching transformer to couple the electrical voltage signals from the hydrophones produced responsive to the acoustic pressure variations sensed by the hydrophones to signal processing equipment on the marine geophysical towing vessel 11, or the hydrophones may be connected to the signal processing equipment in other ways, as by long twisted conductor pairs extending through the lead-in cable to the signal processing equipment connected at their ends remote from the hydrophones to amplifying equipment suitable for such an application. The signal wires from the hydrophones, the hydrophone arrays, and/or the transformers for each section, as well as signal wires which lead through a particular streamer section for connection to signal wires in associated downstream active streamer sections leading to their particular hydrophone units, are connected in some manner at coupling devices provided between adjoining streamer sections, usually by means of multi-terminal male and female plugs.

Each streamer section is typically formed of an outer tubular jacket or hose which is flexibly expandable to some degree, formed for example of polyvinyl material, surrounding and enclosing the internal components of the active streamer section, such as the strain cables, the signal cables, the hydrophone units, and the like. The jacket or jacket segments for each active streamer section are preferably sealed at each end to the end coupling members through which the signal conductors and strain cables pass, so that each streamer section forms one or more sealed chambers which are filled with oil or other liquid fluid to render the streamer substantially neutrally buoyant when filled with the liquid fluid and submerged within the water at the desired depth. The pressure of the fluid within the streamer section is preferably sufficient to dilate or expand the streamer section jackets slightly from its initial assembled condition, and, if desired, buoyancy fluid valves, depth sensing means, and control circuitry may be employed to control the amount of liquid fluid within the streamer section responsive to pressure sensed by the depth sensing device to automatically maintain a predetermined degree of buoyancy. An example of such control means is disclosed in earlier U.S. Pat. No. 3,371,793 granted Mar. 5, 1968 to Raymond H. Pearson, and another example thereof is disclosed in my earlier patent application, Ser. No. 332,816 filed Feb. 16, 1973.

Referring to FIG. 2, showing a fragmentary longitudinal section of a portion of an active streamer section housing a pair of hydrophone units, the outer tubular jacket is indicated by the reference character 16, the strain cables, which in the illustrated example comprise three steel strain cables arranged in a triangular pattern when viewed in transverse section, are indicated by the reference character 17, and the hydrophone units or hydrophone elements are indicated by the reference character 18.

The hydrophone elements 18 are preferably of the construction disclosed in earlier U.S. Pat. No. 3,660,809 granted May 2, 1972 to Raymond H. Pearson, and comprise an annular piezoelectric ring element 19, to which two metal diaphragms 20 are bonded or secured and shaped to provide inwardly concave or dished center sections, as illustrated and described in said earlier Pearson U.S. Pat. No. 3,660,809. Such a hydrophone construction has virtually eliminated the sensitivity of the hydrophone elements to acceleration or inertia effects without impairing their pressure sensing ability. However, there remains an unwanted response due to actual sound pressure fields which are produced by vibratory motions of the various components within the streamers which is to be eliminated by the arrangement of the present invention.

In accordance with the present invention, the hydrophones 18 forming an adjacent successive pair as illustrated in FIG. 2, indicated respectively by the reference characters 18A and 18B, are incorporated in a pair of hydrophone assemblies 22A and 22B mounted in closely spaced relation to the mutually confronting faces of a pair of tightly fitted molded pistons 23, specifically indicated at 23A and 23B in FIG. 2, which are firmly secured to the steel towing cables 17. To this end, the pistons 23 have axial holes or bores extending entirely therethrough, three of which are provided in the illustrated embodiment, paralleling the center axis of the molded pistons 23, one of which is indicated at 24, to receive the strain cables 17 therethrough, the holes 24 having an enlarged bore portion 24A opening through one face of the piston and extending for only a portion of the axial length of the hole 24 to accommodate a suitable sealant material, such as epoxy adhesive compound cured in the bore portions 24A of bores 24 surrounding the strain cables 17, to seal the strain cable openings 24 against leakage. Also, to anchor the cylindrical pistons 23 firmly to the strain cables at their proper longitudinal locations axially of the streamer jacket, outwardly opening cavities 25 in the cylindrical periphery of each molded piston extend inwardly to intercept or communicate with the smaller diameter portions of the holes 24 for the strain cables and receive solder or similar material which is inserted to bond to the strain cable when the piston has been located at the proper position relative thereto. The pair of piston members 23A and 23B supporting the associated pair of hydrophone assemblies 22A and 22B are situated closely together, for example, spaced about 4 inches apart, so that the motion imparted to one piston by the steel strain wires 17 differs very little in phase, amplitude, and frequency from the motion imparted to the other piston of the associated pair. The next pair of pistons and associated hydrophone units are then spaced an appropriate distance, for example, about 6 feet, further along the cable from the first mentioned pair so that the associated pair of hydrophone units is spaced from the next associated pair of hydrophone units in accordance with customary practice.

The space at the cylindrical perimeter of the pistons 23 is sealed against flow of oil or other fill fluid between the cylindrical peripheral wall of the pistons and the interior surface of the outer jacket 16, by tightly clamping the outer jacket to the piston by means of a conventional hose clamp, indicated at 26, such for example as the type known in the trade as a Punch-Lock clamp. While the preferred embodiment herein illustrated employs cable clamps 26 to provide a seal about the cylindrical periphery of the pistons, it will be appreciated that the pistons may be made with a sufficiently large outside diameter so that the interference between the outer jacket 16 and the cylindrical wall of the piston would be adequate to prevent flow of oil or other fill liquid from one side to the other of the pistons and in that circumstance the clamps would not be required.

It will be noted that the pistons 23 in the illustrated embodiment also have a central axial bore 27 which is enlarged over a portion of its axial length as indicated at 27A, to accomodate passage of the bundle of signal wires, indicated at 28 in FIG. 2, which extend from the plug or other connector fitting in the end coupling of the streamer to the hydrophone assemblies within that streamer, and which bundle may include wires which extend entirely through the streamer section for connection to hydrophone units in other associated streamers. The constricted portion of the center bore 27 is sized to correspond substantially to the diameter of the conductor bundle 28 while the enlarged bore portion 27A is designed to be filled with sealant, similar to that employed in the enlarged portion 24A of the strain cable holes, to achieve a fluid seal surrounding the bundle of conductors where they pass through the piston.

To eliminate from the output of the hydrophone pair formed by hydrophone elements 18A and 18B the unwanted response due to actual sound pressure fields produced by vibratory motions of the components within the streamers, and the components within the hydrophones themselves, the hydrophone elements 18A and 18B are each mounted in a cylindrical portion of a hydrophone mounting spider 30 and held against axial movement relative to the streamer section by a plurality of elongated element supports 31, which may be in the form of slightly bowed or arcuate elongated bars having a length corresponding to the axial length of the cylindrical portion 32 of the spider 30 and having a transverse channel shaped recess or curve midway of its length sized to receive the rim portion of the hydrophone element in tightly nested relation therein. The hydrophone mounting spider, in the illustrated embodiment, is a molded plastic body, formed for example of polycarbonate, having a cylindrical cup portion 32 for surrounding and housing the associated hydrophone element, defined by a cylindrical wall 33 and a circular end wall 34, the latter having a pattern of apertures therein as indicated by the holes 35. Three L-shaped legs 36 extend from the end of the cylindrical cup portion opposite the end wall 34 and terminate in radially outwardly projecting flange formations apertured to receive screws for mounting them against the face of the associated piston 23 for supporting the hydrophone element a short distance from the face of the adjacent piston, for example, about 1.3 inches from the piston face in one example.

Figure 4:
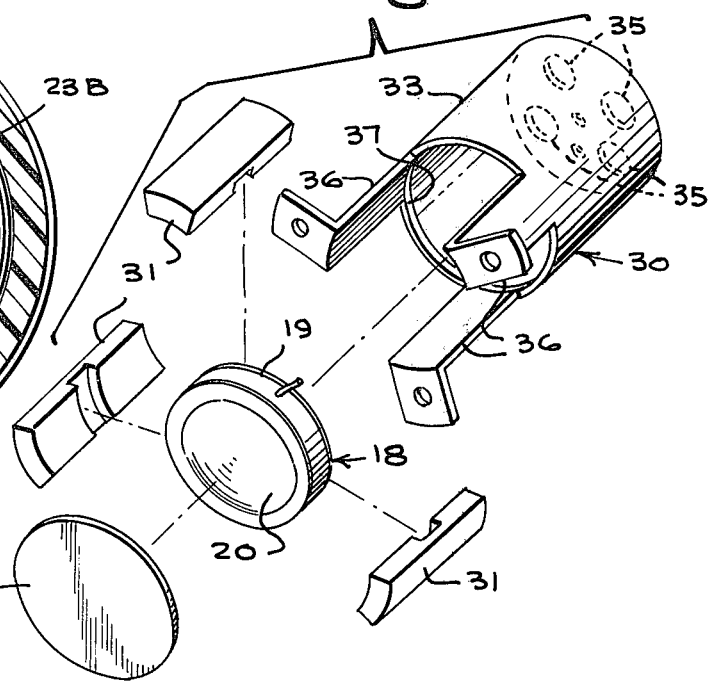
FIG. 4 is an exploded perspective view through the mounting spider assembly.

In the illustrative example, the total axial length of the spider may be about 1.78 inches from the contact face of the leg flanges to the exterior surface of the cylindrical end wall 34, the outer diameter of the cylindrical cup formation may be about 1.125 inches, and the axial length of the cup formation may be about 0.9 inch. In the preferred example, a circular V-shaped inwardly opening recess is formed at the end of the cylindrical cup shaped formation opposite the end wall 34, indicated at 37 in FIG. 4, to permit friction fitting of a removable circular inner end wall 38 in the annular V-shaped recess 37, to be frictionally retained therein. If desired, the removable inner end wall 38 may then be cemented, heat welded or otherwise conventionally secured in position. In the illustrated example, the end wall 34 is provided with four larger diameter holes, for example, about 0.25 inch diameter, for communicating pressure waves to the interior of the cup shaped formation to activate the associated hydrophone element, and may be provided with two smaller diameter holes for mounting conductor terminals therein to connect conductor wires to the conductor leads of the associated hydrophone element. The hydrophone mounting spider 30 is fastened to the adjacent confronting surface of the associated piston 23 by mounting screws, indicated at 39, or other conventional fastening means.

Since the two pistons 23A and 23B for supporting the pair of associated hydrophone elements 22A and 22B are firmly secured to the steel strain cables or towing wires 17 and are situated closely together, for example about 4 inches apart, the motion imparted to one piston by the steel wires differs very little in phase, amplitude and frequency from the motion imparted to the other piston of the associated pair. Since the pistons 23A and 23B are virtually sealed to the outer hose or jacket 16 and to the strain wires 17 and the bundle of conductors 28 passing therethrough, very little sound field traveling in the streamer section can leak through the pistons 23 into the space between them without imparting motion to both pistons in unison. Consequently, the two pistons 23A and 23B of the associated pair move together, both in response to the vibrations transmitted in the hose, in the steel wires, or in the fluid within the streamer section. Thus, any unwanted sound pressure field produced or transmitted in the streamer which would provide unwanted signals cause the faces of the piston 23A and 23B which confront each other and face towards the pair of associated hydrophone assemblies to move in such a way that the two confronting piston faces and the attached hydrophone elements produce identical sound fields of opposite sign so that, if the outputs of the two hydrophone elements 22A and 22B are added, the resulting output caused by the unwanted sound pressure fields produced by vibratory motion of the streamer components will be zero. However, the sound pressure originating outside of the streamer which is desired to be monitored by the hydrophones is in phase at both hydrophone elements 22A and 22B and therefore, the outputs from such externally originating sound pressure is additive. The effect of this is to cause the piston faces and the pair of hydrophone elements mounted thereon to move in such way as to produce equal and opposite signals from the unwanted sound pressure fields so as to cancel out the unwanted signals without impairing the desired signals arising from sound pressure variations externally of the streamer.

What is claimed is:

1. A marine seismic streamer section for an elongated seismic streamer made up of plural sections serially connected together, the streamer section comprising an elongated streamer jacket of generally cylindrical tubular configuration of predetermined inner and outer diameter concentric with a streamer axis including signal wires and strain cables extending through the interior thereof, an array of hydrophone units in the streamer section arranged in closely adjacent pairs of associated hydrophone units to respond to accoustic pressure variations originating externally of the streamer section and produce electrical output signals, means connecting the output signals from each associated pair of hydrophone units in additive relation to provide an added pair output; and means supporting the hydrophone units of each associated pair within said jacket in a manner to effect cancellation in the added pair output from the pair of associated units of unwanted output signals resulting from sound pressure fields produced by vibratory motion of the components forming the streamer section, comprising a pair of cylindrical bodies forming piston members concentric with said streamer axis having an outer diameter corresponding substantially to the inner diameter of said jacket tightly fitted therein and having apertures therethrough through which said strain cables and signal wires pass in tightly fitted relation, sealing means substantially sealing said piston members against the surfaces of said wires and cables and against said jacket to substantially prevent leakage of sound pressure fields travelling in the streamer section into the space between the associated pair of piston members, means firmly securing said piston members to said strain cables passing therethrough, and a pair of spaced hydrophone mounting members fixedly located in said space between the pair of piston members fixed on mounting faces of said respective piston members of said pair transverse to said streamer axis which face inwardly toward said space and confront each other, said mounting members supporting said hydrophone units in fixed spaced relation to their associated mounting faces of the piston members, whereby motion imparted to said mounting faces caused by vibratory motion of the streamer components is substantially identical in phase, amplitude and frequency at both faces producing identical sound fields of opposite sign which activate the pair of hydrophone units to produce opposite sign signals which cancel each other in said added output, each of said mounting members being a rigid body having a cylindrical cup-shaped portion spaced from the mounting face of the supporting piston and encircling the associate hydrophone unit in peripherally supported relation therein at the axial center thereof and having sound pressure communicating apertures in the end wall more remote from the associated mounting face, and said rigid body including plural legs extending integrally from the cup-shaped portion in concentric parallelism with the streamer axis to the associated mounting face and being fastened rigidly thereto.

2. A seismic streamer as defined in claim 1, wherein said hydrophone units are each in a generally cylindrical form having an outer cylindrical surface concentric with the streamer axis and diaphragm end caps peripherally secured to said ring.

3. A seismic streamer as defined in claim 1, wherein said hydrophone units are each in a generally cylindrical form including an annular piezoelectric ring having an outer cylindrical surface concentric with the streamer axis and a pair of thin circular inwardly concave dished diaphragms covering the opposite ends of the ring.

* * * * *